(12) United States Patent
Schuhmann et al.

(10) Patent No.: US 11,731,404 B2
(45) Date of Patent: Aug. 22, 2023

(54) MULTILAYER FILM HAVING HIGH TEAR STRENGTH

(71) Applicant: LOPAREX GERMANY GMBH & CO. KG, Forchheim (DE)

(72) Inventors: Michael Schuhmann, Cadolzburg (DE); Matthias Mauser, Hausen (DE); Christian Hermann, Eggolsheim (DE); Peter Wieland, Forchheim (DE)

(73) Assignee: LOPAREX GERMANY GMBH & CO. KG, Forchheim (DE)

( * ) Notice: Subject to any disclaimer, the term of this patent is extended or adjusted under 35 U.S.C. 154(b) by 729 days.

(21) Appl. No.: 16/647,888

(22) PCT Filed: Sep. 18, 2018

(86) PCT No.: PCT/EP2018/075151
§ 371 (c)(1),
(2) Date: Mar. 17, 2020

(87) PCT Pub. No.: WO2019/057688
PCT Pub. Date: Mar. 28, 2019

(65) Prior Publication Data
US 2020/0223192 A1    Jul. 16, 2020

(30) Foreign Application Priority Data

Sep. 22, 2017  (DE) .................. 10 2017 122 004.6

(51) Int. Cl.
| | | |
|---|---|---|
| *B32B 27/08* | (2006.01) | |
| *B32B 27/32* | (2006.01) | |
| *B32B 27/34* | (2006.01) | |
| *B29C 48/08* | (2019.01) | |
| *B29C 48/10* | (2019.01) | |
| *B29C 48/21* | (2019.01) | |
| *E04D 5/10* | (2006.01) | |
| *B32B 11/04* | (2006.01) | |

(52) U.S. Cl.
CPC ............ *B32B 27/08* (2013.01); *B32B 11/046* (2013.01); *B32B 27/32* (2013.01); *B32B 27/34* (2013.01); *B32B 2307/582* (2013.01); *B32B 2307/7265* (2013.01); *B32B 2405/00* (2013.01)

(58) Field of Classification Search
None
See application file for complete search history.

(56) References Cited

U.S. PATENT DOCUMENTS

2012/0240511 A1\* 9/2012 Engelhard ............... C08L 23/12
428/354

FOREIGN PATENT DOCUMENTS

| DE | 102009057862 A1 | 6/2011 |
|---|---|---|
| EP | 1407878 A1 | 4/2004 |
| EP | 1408096 A1 | 4/2004 |
| WO | 2011/069680 A1 | 6/2011 |
| WO | 2015139844 A1 | 9/2015 |

OTHER PUBLICATIONS

International Preliminary Report on Patentability, Application No. PCT/EP2018/075151 dated Mar. 24, 2020.
International Search Report, Application No. PCT/EP2018/075151 dated Sep. 18, 2018.

\* cited by examiner

*Primary Examiner* — Sheeba Ahmed
(74) *Attorney, Agent, or Firm* — The Dobrusin Law Firm, P.C.

(57) ABSTRACT

The present invention relates to a multilayer film comprising a layer (a) and a layer (c), in each case based on at least one propylene copolymer in an amount of at least 15% by weight, at least one propylene polymer in an amount of at least 40% by weight, in each case based on the total weight of the layer (a)/(c), at least one multi-ply inner layer (b) based on at least one homo- and/or copolyamide comprising isophoronediamine units as a polyamide component, adhesion promoter layers (d) and (e), wherein the thickness of the multi-ply layer (b) is at least 40% of the total thickness of the multilayer film, preferably at least 45% or at least 50%.

20 Claims, No Drawings

MULTILAYER FILM HAVING HIGH TEAR STRENGTH

The present invention relates to a multilayer film comprising one layer (a) and one layer (c), based in each case on at least one propylene copolymer in an amount of at least 15% by weight, at least one propylene polymer in an amount of at least 40% by weight, optionally a further polyolefin, preferably polyethylene, and optionally up to 30% by weight of additives, based in each case on the total weight of the layer (a) or (c), these components always adding up to 100% by weight in each case, at least one multi-ply, inner layer (b) based on at least one homo- and/or copolyamide having isophoronediamine units as polyamide component, one adhesion-promoter layer (d) arranged between the layers (a) and (b) and one adhesion-promoter layer (e) arranged between the layers (b) and (c), based in each case on at least one modified thermoplastic olefin homo- or copolymer, the thickness of the multi-ply layer (b) being at least 40%, preferably at least 45%, more preferably at least 50%, yet more preferably more than 50%, of the total thickness of the multilayer film.

A multiplicity of multilayer films suitable for a multiplicity of technical applications is known from the prior art.

However, some of these technical applications require that the multilayer films used therefor have not only specific barrier properties, but also particular mechanical properties. This is particularly true for multilayer films used for producing waterproof sheeting materials, especially bitumen-based waterproof sheeting materials. Such bitumen-based waterproof sheeting materials are, for example, used as protective covering for roofs.

In the prior art, such waterproof sheeting materials comprising multilayer films are already known.

In many cases, these multilayer films which are known from the prior art and are used for producing waterproof sheeting materials exhibit particular mechanical properties which are sufficient, though in many cases an insufficient tear strength means that it is hardly possible to prevent the risk of damage during the storage, handling and/or laying of said sheeting materials. In addition, the waterproof sheeting materials, such as, for example, for protective coverings for roofs, must also meet high mechanical requirements, in that they are exposed as construction material to a high level of continual weathering effects.

DE 10 2009 057 862 A1 relates to a multilayer film comprising one layer (a) and one layer (c), based in each case on at least one propylene copolymer in an amount of at least 30% by weight and at least one propylene homopolymer in an amount of at least 20% by weight, based in each case on the total weight of the layer (a) or (c), these polymer components always adding up to 100% by weight in each case, at least one inner layer (b) based on at least one homo- and/or copolyamide having isophoronediamine units as polyamide component, one adhesion-promoter layer (d) arranged between the layers (a) and (b) and one adhesion-promoter layer (e) arranged between the layers (b) and (c), based in each case on at least one modified thermoplastic olefin homo- or copolymer, to waterproof sheeting material comprising such a multilayer film and to the use therefor for the protective covering of roofs. There is no disclosure of multi-ply inner layers, let alone those which are based in each case on at least one homo- and/or copolyamide having isophoronediamine units as polyamide component.

WO 2015/139844 A1 relates to an at least monoaxially elongated, multilayered plastics film with separation action and a total thickness ≤18 µm, preferably ≤12 µm, which has an at least partial embossing on at least one surface.

EP 1 407 878 relates to a film-bitumen composite comprising at least three layers, especially for use as protective-covering sheeting material on roof surfaces, with at least two film layers composed of different materials being provided.

EP 1 408 096 relates to a film composite comprising at least two layers, especially for use as release film for oily sheeting materials, with at least two film layers consisting of different materials.

There is a need for multilayer films which are distinguished by an improved stability against mechanical actions in particular and by an excellent durability.

It is therefore an object of the present invention to provide multilayer films which exhibit a minimized risk of damage due to mechanical action during storage and processing owing to an excellent tear strength.

This object is achieved by providing a multilayer film comprising at least (a) one layer (a) based on at least one propylene copolymer in an amount of at least 15% by weight, preferably at least 20% by weight, at least one propylene homopolymer in an amount of at least 40% by weight, preferably at least 45% by weight, and optionally up to 30% by weight of additives, based in each case on the total weight of the layer (a), the components always adding up to 100% by weight, (b) one multi-ply, inner layer (b) based on at least one homo- and/or copolyamide having isophoronediamine units as a polyamide component, (c) one layer (c) based on at least one propylene copolymer in an amount of at least 15% by weight, preferably at least 20% by weight, at least one propylene homopolymer in an amount of at least 40% by weight, preferably at least 45% by weight, and optionally up to 30% by weight of additives, based in each case on the total weight of the layer (c), the components always adding up to 100% by weight, and (d) and (e) one adhesion-promoter layer (d) arranged between the layer (a) and the layer (b) and one adhesion-promoter layer (e) arranged between the layer (b) and the layer (c), based in each case on at least one modified thermoplastic olefin homo- or copolymer, the thickness of the multi-ply layer (b) being at least 40%, preferably at least 45%, more preferably at least 50%, yet more preferably more than 50%, of the total thickness of the multilayer film.

Preferably, the layers (a) and (c) are surface layers of the multilayer film according to the invention.

The layer (a), identical to or different from the layer (c) of the multilayer film according to the invention, contains at least one propylene copolymer in an amount of at least 15% by weight, preferably of at least 20% by weight, more preferably of at least 25% by weight, yet more preferably of at least 30% by weight, preferably up to ≤50% by weight, preferably up to ≤45% by weight, more preferably up to ≤40% by weight, based in each case on the total weight of the layer (a) or layer (c).

Suitable as propylene copolymer of the layer (a) or (c) of the multilayer film according to the invention is preferably at least one copolymer composed of propylene and an α,β-unsaturated olefin having preferably 2 or 4-6 carbon atoms. Particularly preferably, the layer (a) or (c) comprises at least one propylene copolymer selected from the group comprising propylene-ethylene copolymers, propylene-butylene copolymers, propylene-isobutylene copolymers and mixtures of at least two of the stated copolymers. Very particularly preferably, at least one propylene-ethylene copolymer is suitable for the layer (a) or (c).

Particularly preferably, the layer (a) or (c) contains at least one propylene-ethylene copolymer which comprises not more than 10% by weight, preferably 1 to 10% by weight, particularly preferably 5-10% by weight, very particularly preferably 7-9% by weight, of ethylene units, based on the total weight of the propylene-ethylene copolymer.

The layer (a) or (c) of the multilayer film according to the invention contains, in both cases, at least one propylene homopolymer in an amount of at least 40% by weight, preferably at least 45% by weight, more preferably at least 50% by weight, preferably up to ≤80% by weight, more preferably up to ≤75% by weight, yet more preferably up to ≤70% by weight, based in each case on the total weight of the layer (a) or layer (c).

In a preferred embodiment, the proportion by weight of the propylene homopolymer is greater than the proportion by weight of the propylene copolymer. Preferably, the difference between the proportion by weight of the propylene homopolymer and the proportion by weight of the propylene copolymer is absolutely not more than ±20% by weight, not more than ±18% by weight, not more than ±16% by weight, not more than ±14% by weight, not more than ±12% by weight, not more than ±10% by weight, or not more than ±8% by weight.

The layer (c) is preferably the second surface layer of the multilayer film according to the invention.

Preferably, the propylene copolymer is a propylene-ethylene copolymer, the following table summarizing particularly preferred embodiments $A^1$ to $A^9$ with respect to the composition of the layer (a) or (c) of the multilayer film according to the invention:

| [% by weight] | $A^1$ | $A^2$ | $A^3$ | $A^4$ | $A^5$ | $A^6$ | $A^7$ | $A^8$ | $A^9$ |
|---|---|---|---|---|---|---|---|---|---|
| Homopolymer | 62 ± 22 | 62 ± 20 | 62 ± 18 | 62 ± 16 | 62 ± 14 | 62 ± 12 | 62 ± 10 | 62 ± 8 | 62 ± 6 |
| Copolymer | 20 ± 5 | 20 ± 4.5 | 20 ± 4 | 20 ± 3.5 | 20 ± 3 | 20 ± 2.5 | 20 ± 2 | 20 ± 1.5 | 20 ± 1 |

Preferably, the propylene copolymer is a propylene-ethylene copolymer, the following table summarizing particularly preferred embodiments $B^1$ to $B^9$ with respect to the composition of the layer (a) or (c) of the multilayer film according to the invention:

| [% by weight] | $B^1$ | $B^2$ | $B^3$ | $B^4$ | $B^5$ | $B^6$ | $B^7$ | $B^8$ | $B^9$ |
|---|---|---|---|---|---|---|---|---|---|
| Homopolymer | 45 ± 5 | 45 ± 4.5 | 45 ± 4 | 45 ± 3.5 | 45 ± 3 | 45 ± 2.5 | 45 ± 2 | 45 ± 1.5 | 45 ± 1 |
| Copolymer | 37 ± 22 | 37 ± 20 | 37 ± 18 | 37 ± 16 | 37 ± 14 | 37 ± 12 | 37 ± 10 | 37 ± 8 | 37 ± 6 |

The layer (a) or the layer (c) of the multilayer film according to the invention has, in both cases and independently of one another, preferably a layer thickness of from 5 μm to 100 μm, particularly preferably from 10 μm to 60 μm, very particularly preferably from 15 μm to 50 μm.

In a preferred embodiment of the multilayer film according to the invention, the layer (a) and the layer (c) have an identical layer structure, preferably an identical layer thickness and identical polymer components.

The layer (b) of the multilayer film according to the invention is a multi-ply, inner layer, preferably central with regard to the layer structure of the multilayer film, based on at least one homo- and/or copolyamide having isophoronediamine units. The multi-ply layer (b) can comprise at least 2 plies, preferably up to 6 plies. In preferred embodiments, the layer (b) is at least two-ply, at least three-ply, at least four-ply or at least five-ply, all plies being preferably based on at least one homo- and/or copolyamide having isophoronediamine units.

The multi-ply layer (b) preferably does not comprise a ply which is not based on a homo- and/or copolyamide having isophoronediamine units.

Preferably, the plies of the layer (b) each have, independently of one another, a thickness within the range of 2 μm to 30 μm, more preferably 5 μm to 25 μm, yet more preferably 10 μm to 20 μm, most preferably 11 μm to 19 μm.

Preferably, the multi-ply layer (b) has a total layer thickness (all plies together) of at least 25 μm, more preferably at least 50 μm, yet more preferably at least 60 μm, most preferably at least 70 μm, and in particular at least 75 μm.

If the multi-ply layer (b) is at least three-ply, it is possible for two outer plies and one or more plies arranged between said two outer plies (intermediate plies) of the multi-ply layer (b) to differ.

In a preferred embodiment, all plies have the same composition.

In another preferred embodiment, the two outer plies differ in composition from the plies arranged between said two outer plies (intermediate plies). Preferably, in this case, the two outer plies each have the same composition. Preferably, in this case, the plies arranged between said two outer plies (intermediate plies) each have the same composition.

Preferably, the multi-ply layer (b) of the multilayer film according to the invention not only serves as a barrier layer, particularly preferably as a gas-barrier layer, preferably as an oxygen-barrier layer, a water-vapor-barrier layer and/or an oil-barrier layer, very particularly preferably as an oil-barrier layer, but also leads to a distinct improvement in the tear strength of the multilayer film according to the invention. As a result, it is possible to distinctly reduce damage to, for example, rolled-up multilayer films or corresponding waterproof sheeting materials during storage and/or processing due to mechanical stress or action and to thus prevent defects at an early stage, for example in the case of protective coverings for roofs. With the aid of the multilayer film containing one multi-ply layer (b) composed of the below-listed polyamides and/or copolyamides, it is surprisingly possible to obtain multilayer films having a tear strength surprisingly improved for the processing thereof, provided that the multi-ply layer (b) not only comprises of plies with copolyamides having isophoronediamine units, but also the thickness of the multi-ply layer (b) is at least 40%, more preferably at least 45%, yet more preferably at least 50%, preferably up to 85%, of the total thickness of the multilayer film.

Homo- and/or copolyamides having isophoronediamine units as diamine units that are suitable for producing the multi-ply layer (b) are preferably at least one homo- or copolyamide selected from the group comprising thermoplastic, aliphatic, semiaromatic and aromatic homo- or copolyamides having isophoronediamine units. Said copolyamides having isophoronediamine units can be constructed from further aliphatic and/or cycloaliphatic diamines having 2-10 carbon atoms such as hexamethylenediamine and/or aromatic diamines having 6-10 carbon atoms such as p-phenylenediamine, and from aliphatic and/or aromatic dicarboxylic acids having 6-14 carbon atoms such as, for example, adipic acid, terephthalic acid or isophthalic acid. Furthermore, the copolyamides having isophoronediamine units can also be constructed from lactams having 4-10 carbon atoms such as, for example, from ε-caprolactam. Preferably, each ply of the layer (b) comprises at least one homo- and/or copolyamide having isophoronediamine units. Polyamides having isophoronediamine units that are used according to the invention are preferably copolyamides formed from ε-caprolactam, isophoronediamine and an aromatic dicarboxylic acid, preferably isophthalic acid.

Preferably, all plies of the layer (b) contain at least one of the stated homo- and/or copolyamides having isophoronediamine units, particularly preferably at least one copolyamide having isophoronediamine units, it being possible for the copolyamides to have a differing and identical proportion of isophoronediamine units.

Preferably, the proportion of isophoronediamine units of the copolyamides used is at least 1% by weight up to 10% by weight, preferably at least 3% by weight to 10% by weight, particularly preferably at least 5% by weight to 10% by weight, based in each case on the total weight of the copolyamide.

the total weight of one ply of the multi-ply layer (b), the copolyamide components always adding up to 100%.

Such homo- and/or copolyamides which are suitable as further polyamide component and which do not have isophoronediamine units can preferably be selected from the group comprising thermoplastic, aliphatic, semiaromatic and aromatic homo- or copolyamides. Said homo- or copolyamides which do not have isophoronediamine units can be constructed from aliphatic and/or cycloaliphatic diamines having 2-10 carbon atoms such as hexamethylenediamine and/or aromatic diamines having 6-10 carbon atoms such as p-phenylenediamine, and from aliphatic and/or aromatic dicarboxylic acids having 6-14 carbon atoms such as, for example, adipic acid, terephthalic acid or isophthalic acid. Furthermore, said homo- or copolyamides can be produced from lactams having 4-10 carbon atoms such as, for example, from ε-caprolactam. Homo- and/or copolyamides which are used according to the invention and which do not have isophoronediamine units are preferably selected from the group comprising PA 6, PA 12, PA 66, PA 6I, PA 6T, corresponding copolymers and mixtures of at least two of the stated polyamides.

Particularly preferably, the multi-ply layer (b) of the multilayer film according to the invention is five-ply (outer ply 1, intermediate ply 1, intermediate ply 2, intermediate ply 3, outer ply 2), the following table summarizing particularly preferred embodiments $C^1$ to $C^8$ with respect to the composition of the individual plies; in said table, "CoPA" means a copolyamide having isophoronediamine units and "PA" means a homo- or copolyamide without isophoronediamine units:

| [% by weight] | | $C^1$ | $C^2$ | $C^3$ | $C^4$ | $C^5$ | $C^6$ | $C^7$ | $C^8$ |
|---|---|---|---|---|---|---|---|---|---|
| Outer ply 1 | CoPA | 50-100 | 50-100 | 60 ± 20 | 60 ± 15 | 60 ± 10 | 60 ± 20 | 60 ± 15 | 60 ± 10 |
| | PA | 0-50 | 0-50 | 40 ± 20 | 40 ± 15 | 40 ± 10 | 40 ± 20 | 40 ± 15 | 40 ± 10 |
| Intermediate ply 1 | CoPA | 50-100 | 90-100 | 90-100 | 90-100 | 90-100 | 100 | 100 | 100 |
| | PA | 0-50 | 0-10 | 0-10 | 0-10 | 0-10 | 0 | 0 | 0 |
| Intermediate ply 2 | CoPA | 50-100 | 90-100 | 90-100 | 90-100 | 90-100 | 100 | 100 | 100 |
| | PA | 0-50 | 0-10 | 0-10 | 0-10 | 0-10 | 0 | 0 | 0 |
| Intermediate ply 3 | CoPA | 50-100 | 90-100 | 90-100 | 90-100 | 90-100 | 100 | 100 | 100 |
| | PA | 0-50 | 0-10 | 0-10 | 0-10 | 0-10 | 0 | 0 | 0 |
| Outer ply 2 | CoPA | 50-100 | 50-100 | 60 ± 20 | 60 ± 15 | 60 ± 10 | 60 ± 20 | 60 ± 15 | 60 ± 10 |
| | PA | 0-50 | 0-50 | 40 ± 20 | 40 ± 15 | 40 ± 10 | 40 ± 20 | 40 ± 15 | 40 ± 10 |

Preferably, all plies of the layer (b) comprise the same type of homopolyamide and/or copolyamide having isophoronediamine units, it being possible for the amount of said homo- and/or copolyamide in the individual plies of the layer (b) to be different and to be from 25% by weight to 100% by weight, based in each case on the total weight of the ply.

Preferably, at least 60% of the multi-ply layer (b) consists of the same homo- and/or copolyamide having isophoronediamine units.

Very particularly preferably, the homo- or copolyamides having isophoronediamine units of the layer (b) have aliphatic or aromatic dicarboxylic acid units, preferably aromatic dicarboxylic acid units, selected from the group comprising terephthalic acid units and isophthalic acid units.

In a further embodiment, one or more plies of the layer (b) can comprise, besides a homo- and/or copolyamide having isophoronediamine units, at least one polyamide without isophoronediamine units as a further polyamide component, can comprise preferably an aliphatic homo- and/or copolyamide, preferably in an amount of at least 30% by weight, particularly preferably of at least 40% by weight, based on The multi-ply layer (b) of the multilayer film according to the invention has a layer thickness of at least 40%, preferably at least 45%, more preferably at least 50%, of the total thickness of the multilayer film according to the invention, preferably up to 85% of the total thickness.

The adhesion-promoter layers (d) and (e) of the multilayer film according to the invention are each based on at least one modified thermoplastic olefin homo- or copolymer.

Suitable for producing the adhesion-promoter layers (d) and (e) are preferably modified thermoplastic olefin homo- or copolymers of α,β-unsaturated olefins having 2-10 carbon atoms such as, for example, polyethylene (PE, especially LDPE or HDPE), polypropylene (PP), polybutylene (PB), polyisobutylene (PI) or mixtures of at least two of the stated polymers. "LDPE" refers to low-density polyethylene, which has a density within the range of 0.86-0.93 g/cm$^3$ and is distinguished by a high degree of branching of the molecules. "HDPE" refers to high-density polyethylene, which has only little branching of the molecular chain, and the density can be within the range between 0.94 and 0.97 g/cm$^3$. A preferred thermoplastic modified olefin homo- or copolymer for producing the adhesion-promoter layers (d)

and (e) is modified propylene homopolymer. Preferably, the thermoplastic olefin homo- or copolymers are modified with polar groups, preferably with organic acid groups (carboxyl groups) and/or organic anhydride groups, particularly preferably maleic anhydride groups.

Preferably, the adhesion-promoter layers (d) and (e) are each based on at least one modified propylene homopolymer, preferably in an amount of, in each case, at least 45% by weight, particularly preferably of at least 55% by weight, very particularly preferably of at least 65% by weight, very particularly preferably of at least 70% by weight, based in each case on the total weight of the adhesion-promoter layer (d) or (e).

In a preferred embodiment of the multilayer film according to the invention, the adhesion-promoter layers (d) and/or (e) can contain as further polyolefin component, in each case and independently of one another, at least one unmodified olefin homo- or copolymer, preferably, in each case and independently of one another, at least one unmodified olefin homopolymer, particularly preferably, in each case, an unmodified propylene homopolymer, preferably, in each case, in a proportion of up to 30% by weight, based in each case on the total weight of the adhesion-promoter layer (d) or (e), the polyolefin components always adding up to 100% by weight.

In a preferred embodiment, the adhesion-promoter layers (d) and/or (e) contain as further polyolefin component, in each case and independently of one another, at least one unmodified olefin homo- or copolymer in an amount of from 5% to 30% by weight, preferably from 15% to 30% by weight, the polyolefin components always adding up to 100% by weight in each case.

In a further preferred embodiment of the multilayer film according to the invention, the adhesion-promoter layers (d) and/or (e) contain as further polymer component, in each case and independently of one another, at least one copolymer composed of an olefin and at least one further $\alpha,\beta$-unsaturated monomer having at least one ester group, particularly preferably, in each case and independently of one another, at least one copolymer composed of ethylene or propylene and at least one compound selected from the group comprising vinyl acetate and alkyl (meth)acrylate, preferably methyl (meth)acrylate, ethyl (meth)acrylate, n- and isopropyl (meth)acrylate, n- and isobutyl (meth)acrylate, tert-butyl (meth)acrylate, 2-ethylhexyl (meth)acrylate, cyclohexyl (meth)acrylate and isobornyl (meth)acrylate, preferably in an amount of from 0.1% to 30% by weight, particularly preferably from 1% to 20% by weight, very particularly preferably from 2% to 10% by weight, based in each case on the total weight of the adhesion-promoter layer (d) or (e), the polymer components always adding up to 100% by weight.

Preferably, at least one copolymer selected from the group comprising ethylene-vinyl acetate copolymers and ethylene-$C_{1-4}$-alkyl (meth)acrylate copolymers, preferably an ethylene-vinyl acetate copolymer and/or an ethylene-butyl acrylate copolymer, is present as further polymer component of the adhesion-promoter layers (d) and/or (e).

The adhesion-promoter layers (d) and (e) of the multilayer film according to the invention have, in each case and independently of one another, preferably a layer thickness of from 1 μm to 30 μm, particularly preferably from 2 μm to 25 μm, very particularly preferably from 3 μm to 20 μm, in particular from 4 μm to 15 μm.

In a preferred embodiment of the multilayer film according to the invention, the adhesion-promoter layers (d) and (e) have an identical layer structure, preferably an identical layer thickness and identical polymer components.

In a preferred embodiment, the multilayer film according to the invention is arranged symmetrically in relation to a central layer (b).

If necessary, the layer (a), the multi-ply layer (b), the layer (c) and also the adhesion-promoter layers (d) and (e) can, in each case and independently of one another, be doped with additives selected from the group comprising antioxidants, antiblocking agents, antifogging agents, antistatic agents, active antimicrobial ingredients, light protectors, UV absorbers, UV filters, dyes, color pigments, stabilizers, preferably heat stabilizers, process stabilizers and UV and/or light stabilizers, preferably based on at least one sterically hindered amine (HALS), processing aids, flame retardants, nucleating agents, crystallization agents, preferably crystal-nucleating agents, lubricants, optical brighteners, flexibilizers, sealing agents, plasticizers, silanes, spacers, fillers, peel additives, waxes, wetting agents, surface-active compounds, preferably surfactants, and dispersing agents.

The layer (a), the multi-ply layer (b), the layer (c) and also the adhesion-promoter layers (d) and (e) can, in each case and independently of one another, contain at least 0.01-30% by weight, preferably at least 0.1-20% by weight, based in each case on the total weight of an individual layer, of at least one of the abovementioned additives. To this end, it is possible to incorporate the additives in the form of master batches in polyolefins, such as polyethylene, or polyamides into the particular layer.

The multilayer film according to the invention preferably has a total layer thickness of at least 80 μm, preferably at least 100 μm, preferably from 100 μm to 350 μm, particularly preferably from 120 μm to 300 μm.

Preferably, the multilayer film according to the invention has a tear strength higher by at least 10% both in the machine direction (MD) and cross-machine direction (CD) as per ASTM 1970 in comparison with a multilayer film, the PA layer of which is ≤50% of the total thickness of the multilayer film. This is also confirmed by measurement of the particular tear strength in accordance with GB/T 529-2008.

In a preferred embodiment, the multilayer film according to the invention comprises at least one preferably permanently adhesion-capable layer of adhesive (f) particularly preferably one pressure-sensitive layer of adhesive, and/or at least one layer (h) based on a sealing composition, preferably on a self-adhesive sealing composition, particularly preferably on a self-adhesive bitumen-based sealing composition or a self-adhesive sealing composition based on rubber, preferably butyl rubber, especially on a low-temperature self-adhesive or high-temperature self-adhesive bitumen-based sealing composition, especially preferably on a low-temperature self-adhesive bitumen-based sealing composition, optionally in each case on one of its surface layers. If the multilayer film according to the invention comprises at least one layer (h) and/or at least one layer of adhesive (f), this can have, in each case, optionally on its surface a removable protective film or a removable protective layer (g), preferably based on siliconized paper.

The present invention further provides a process for producing the multilayer film according to the invention.

In a preferred embodiment, the layers (a), (c), (d), (e) and the multi-ply layer (b) of the multilayer film according to the invention can be produced and processed as an entire, multilayered film in the form of a tubular film.

In another preferred embodiment, the layers (a), (c), (d), (e) and the multi-ply layer (b) of the multilayer film according to the invention can be produced and processed as a whole as a cast film.

Accordingly, the individual layers (a), and plies of the layer (b), (c), (d) and (e) of the multilayer film according to the invention can be produced by coextrusion.

The multilayer film according to the invention composed of the layers (a), (c), (d), (e) and the plies of the layer (b) is preferably obtainable by (co)extrusion, particularly preferably by blown-film (co)extrusion or by cast (co)extrusion.

If the multilayer film according to the invention comprises one preferably permanently adhesion-capable layer of adhesive (f), preferably one pressure-sensitive layer of adhesive (f), on one of its surface layers, said layer of adhesive (f) can be produced by coating or lamination of one of the surfaces of the layer composite of the layers (a), (c), (d), (e) and of the multi-ply layer (b) of the multilayer film according to the invention with the layer of adhesive (f). To protect the layer of adhesive (f), the surface thereof can optionally be provided with a removable protective film or a removable protective layer (g) as protective covering in a following work step.

If the multilayer film according to the invention comprises one layer (h) based on a sealing composition on one of its nonpermanently adhesion-capable surface layers, said layer (h) can be bonded to one of the surfaces of the layer composite of the layers (a), of the multi-ply layer (b), of the layers (c), (d), (e) and optionally (f) of the multilayer film according to the invention by coating or lamination using customary lamination adhesives. If the layer (h) is based on a self-adhesive sealing composition, the multilayer film according to the invention can be bonded to the layer (h) by simple coating, optionally with cooling or heating of the sealing composition. To protect the layer (h), the surface thereof can optionally be provided with a removable protective film or a removable protective layer (g) as protective covering in a following work step.

The respective production processes and corresponding production parameters are known in general to a person skilled in the art.

The multilayer film according to the invention can preferably be printed and/or colored.

The multilayer film according to the invention with layer of adhesive is preferably used as adhesive tape.

The present invention therefore further provides for the use of the multilayer film according to the invention for producing an adhesive tape and for the use of the multilayer film according to the invention in the form of an adhesive tape.

The present invention further provides an adhesive tape comprising a multilayer film according to the invention.

The multilayer film according to the invention with sealing composition is preferably also used as waterproof sheeting material.

The present invention therefore further provides for the use of the multilayer film according to the invention for producing a waterproof sheeting material, preferably a bitumen-based waterproof sheeting material, and for the use of the multilayer film according to the invention in the form of a waterproof sheeting material, preferably bitumen-based waterproof sheeting material, for protective covering for roofs, for pipe cladding, for external cladding, for protective covering for buildings or parts thereof.

The present invention further provides a waterproof sheeting material, preferably a bitumen-based waterproof sheeting material, preferably against water and/or weathering effects, comprising a multilayer film according to the invention.

The present invention further provides a waterproof sheeting material, preferably a bitumen-based waterproof sheeting material, comprising multilayer film according to the invention as protective covering for roofs, as external cladding, as protective covering for buildings or parts thereof or as pipe cladding, preferably as waterproof sleeve.

DETERMINATION OF TEAR STRENGTH

Tear strength is determined in accordance with ASTM 1970 and specified in [N].

DETERMINATION OF TEAR STRENGTH IN ACCORDANCE WITH GB/T 529 (2008)

Tear strength is determined in accordance with GB/T 529 and specified in [N]. The following examples and comparative examples serve to elucidate the invention, but are not to be interpreted as limiting.

All the following % data are % by weight in each case.

I. CHEMICAL CHARACTERIZATION

| Identification | Description | Tm [° C.] | Density [g/cm³] |
|---|---|---|---|
| PP Homo | Propylene homopolymer | 163 | 0.9 |
| PP HeCo | Heterophasic propylene (block) copolymer (proportion of ethylene 7-9%) | 164 | 0.9 |
| HV | Maleic anhydride-group modified polypropylene as adhesion promoter | 160 | 0.9 |
| CoPA | Copolyamide, formed from ε-caprolactam, isophoronediamine and isophthalic acid, having a proportion of isophoronediamine of approx. 5% | 212 | 1.13 |
| PA 6 | Polyamide composed of ε-caprolactam | 222 | 1.14 |
| UV additive | UV stabilizing master batch with a sterically hindered amine derivative | n.a. | 0.92 |
| Batch I: | Color batch containing approx. 50% by weight of polyethylene as polymer component | n.a. | 1.14 |
| Batch II: | Color batch containing approx. 30% by weight of polyethylene as polymer component | n.a. | 1.98 |

II. PRODUCTION OF THE MULTILAYER FILMS

The individual layers, and plies of the layer b), of the multilayer films as per comparative examples V1 to V3 and as per examples B1 to B5, as indicated in Tables 1-8, adjoin one another in the indicated sequence of the individual layers, and plies of the layer b), in each case, and were produced by blow-film coextrusion in each case. The respective layer compositions, respective layer thicknesses and respective total layer thickness can be gathered from the corresponding Tables 1 to 8. This also applies to the plies of the layer b).

III. EXAMPLES AND COMPARATIVE EXAMPLES

TABLE 1

V1

| Layer | Material | Proportion [%] | Layer thickness [μm] | Total thickness [μm] |
|---|---|---|---|---|
| (a) | PP Homo | 20 | 42 | 125 |
|  | PP HeCo | 40 |  |  |
|  | Batch I | 40 |  |  |
| (d) | HV | 75 | 8 |  |
|  | PP Homo | 25 |  |  |
| (b) | CoPA | 50 | 25 |  |
|  | PA 6 | 50 |  |  |
| (e) | HV | 75 | 8 |  |
|  | PP Homo | 25 |  |  |
| (c) | PP Homo | 20 | 42 |  |
|  | PP HeCo | 40 |  |  |
|  | Batch I | 40 |  |  |

TABLE 2

V2

| Layer | Material | Proportion [%] | Layer thickness [μm] | Total thickness [μm] |
|---|---|---|---|---|
| (a) | PP Homo | 62 | 47.5 | 140 |
|  | PP HeCo | 20 |  |  |
|  | UV additive | 5 |  |  |
|  | Batch I | 13 |  |  |
| (d) | HV | 72 | 10 |  |
|  | UV additive | 3 |  |  |
|  | PP Homo | 25 |  |  |
| (b) | CoPA | 100 | 25 |  |
| (e) | HV | 62 | 10 |  |
|  | UV additive | 3 |  |  |
|  | PP Homo | 25 |  |  |
|  | Batch I | 10 |  |  |
| (c) | PP Homo | 62 | 47.5 |  |
|  | PP HeCo | 20 |  |  |
|  | UV additive | 5 |  |  |
|  | Batch II | 13 |  |  |

TABLE 3

V3

| Layer | Material | Proportion [%] | Layer thickness [μm] | Total thickness [μm] |
|---|---|---|---|---|
| (a) | PP Homo | 62 | 35 | 140 |
|  | PP HeCo | 20 |  |  |
|  | UV additive | 5 |  |  |
|  | Batch I | 13 |  |  |
| (d) | HV | 72 | 10 |  |
|  | UV additive | 3 |  |  |
|  | PP Homo | 25 |  |  |
| (b) | CoPA | 100 | 10 |  |
|  | CoPA | 100 | 10 |  |
|  | CoPA | 100 | 10 |  |
|  | CoPA | 100 | 10 |  |
|  | CoPA | 100 | 10 |  |
| (e) | HV | 62 | 10 |  |
|  | UV additive | 3 |  |  |
|  | PP Homo | 25 |  |  |
|  | Batch I | 10 |  |  |
| (c) | PP Homo | 62 | 35 |  |
|  | PP HeCo | 20 |  |  |
|  | UV additive | 5 |  |  |
|  | Batch II | 13 |  |  |

TABLE 4

B1

| Layer | Material | Proportion [%] | Layer thickness [μm] | Total thickness [μm] |
|---|---|---|---|---|
| (a) | PP Homo | 62 | 22.5 | 140 |
|  | PP HeCo | 20 |  |  |
|  | UV additive | 5 |  |  |
|  | Batch I | 13 |  |  |
| (d) | HV | 72 | 10 |  |
|  | UV additive | 3 |  |  |
|  | PP Homo | 25 |  |  |
| (b) | CoPA | 100 | 15 |  |
|  | CoPA | 100 | 15 |  |
|  | CoPA | 100 | 15 |  |
|  | CoPA | 100 | 15 |  |
|  | CoPA | 100 | 15 |  |
| (e) | HV | 62 | 10 |  |
|  | UV additive | 3 |  |  |
|  | PP Homo | 25 |  |  |
|  | Batch I | 10 |  |  |
| (c) | PP Homo | 62 | 22.5 |  |
|  | PP HeCo | 20 |  |  |
|  | UV additive | 5 |  |  |
|  | Batch II | 13 |  |  |

TABLE 5

B2

| Layer | Material | Proportion [%] | Layer thickness [μm] | Total thickness [μm] |
|---|---|---|---|---|
| (a) | PP Homo | 62 | 22.5 | 140 |
|  | PP HeCo | 20 |  |  |
|  | UV additive | 5 |  |  |
|  | Batch I | 13 |  |  |
| (d) | HV | 72 | 10 |  |
|  | UV additive | 3 |  |  |
|  | PP Homo | 25 |  |  |
| (b) | CoPA | 60 | 15 |  |
|  | PA 6 | 40 |  |  |
|  | CoPA | 100 | 15 |  |
|  | CoPA | 100 | 15 |  |
|  | CoPA | 100 | 15 |  |
|  | CoPA | 60 | 15 |  |
|  | PA 6 | 40 |  |  |
| (e) | HV | 62 | 10 |  |
|  | UV additive | 3 |  |  |
|  | PP Homo | 25 |  |  |
|  | Batch I | 10 |  |  |
| (c) | PP Homo | 62 | 22.5 |  |
|  | PP HeCo | 20 |  |  |
|  | UV additive | 5 |  |  |
|  | Batch II | 13 |  |  |

TABLE 6

B3

| Layer | Material | Proportion [%] | Layer thickness [μm] | Total thickness [μm] |
|---|---|---|---|---|
| (a) | PP Homo | 45 | 22.5 | 140 |
|  | PP HeCo | 37 |  |  |
|  | UV additive | 5 |  |  |
|  | Batch I | 13 |  |  |
| (d) | HV | 72 | 10 |  |
|  | UV additive | 3 |  |  |
|  | PP Homo | 25 |  |  |
| (b) | CoPA | 60 | 15 |  |
|  | PA 6 | 40 |  |  |
|  | CoPA | 100 | 15 |  |
|  | CoPA | 100 | 15 |  |
|  | CoPA | 60 | 15 |  |
|  | PA 6 | 40 |  |  |
| (e) | HV | 62 | 10 |  |
|  | UV additive | 3 |  |  |
|  | PP Homo | 25 |  |  |
|  | Batch I | 10 |  |  |
| (c) | PP Homo | 45 | 22.5 |  |
|  | PP HeCo | 37 |  |  |
|  | UV additive | 5 |  |  |
|  | Batch II | 13 |  |  |

TABLE 7

B4

| Layer | Material | Proportion [%] | Layer thickness [μm] | Total thickness [μm] |
|---|---|---|---|---|
| (a) | PP Homo | 62 | 17.5 | 125 |
|  | PP HeCo | 20 |  |  |
|  | UV additive | 5 |  |  |
|  | Batch I | 13 |  |  |
| (d) | HV | 72 | 10 |  |
|  | UV additive | 3 |  |  |
|  | PP Homo | 25 |  |  |
| (b) | CoPA | 60 | 14 |  |
|  | PA 6 | 40 |  |  |
|  | CoPA | 100 | 14 |  |
|  | CoPA | 100 | 14 |  |
|  | CoPA | 100 | 14 |  |
|  | CoPA | 60 | 14 |  |
|  | PA 6 | 40 |  |  |
| (e) | HV | 62 | 10 |  |
|  | UV additive | 3 |  |  |
|  | PP Homo | 25 |  |  |
|  | Batch I | 10 |  |  |
| (c) | PP Homo | 62 | 17.5 |  |
|  | PP HeCo | 20 |  |  |
|  | UV additive | 5 |  |  |
|  | Batch II | 13 |  |  |

TABLE 8

B5

| Layer | Material | Proportion [%] | Layer thickness [μm] | Total thickness [μm] |
|---|---|---|---|---|
| (a) | PP Homo | 62 | 22.5 | 140 |
|  | PP HeCo | 20 |  |  |
|  | UV additive | 5 |  |  |
|  | Batch I | 13 |  |  |
| (d) | HV | 72 | 10 |  |
|  | UV additive | 3 |  |  |
|  | PP Homo | 25 |  |  |
| (b) | CoPA | 100 | 12 |  |
|  | CoPA | 100 | 16 |  |
|  | CoPA | 100 | 19 |  |
|  | CoPA | 100 | 16 |  |
|  | CoPA | 100 | 12 |  |
| (e) | HV | 62 | 10 |  |
|  | UV additive | 3 |  |  |
|  | PP Homo | 25 |  |  |
|  | Batch I | 10 |  |  |
| (c) | PP Homo | 62 | 22.5 |  |
|  | PP HeCo | 20 |  |  |
|  | UV additive | 5 |  |  |
|  | Batch II | 13 |  |  |

TABLE 9

[GB/T 529 - 2008 measurement values: mean from, in each case, 32 measurement points]

| Film | Total thickness [μm] | No. plies layer (b) | Thickness layer (b) [μm] | Thickness layer (b) [%] | Outer layer (a)/(c) [% by weight] PP-Homo | Outer layer (a)/(c) [% by weight] PP-Copo | Tear strength as per GB/T 529 [N] (MD) | Tear strength as per GB/T 529 [N] (CD) | Tear strength as per ASTM 1970 [N] (MD) | Tear strength as per ASTM 1970 [N] (CD) |
|---|---|---|---|---|---|---|---|---|---|---|
| V1 | 125 | 1 | 25 | 20 | 20 | 40 | 20.98 | 22.45 | 160 | 140 |
| V2 | 140 | 1 | 25 | 17.9 | 62 | 20 | 23.75 | 21.94 | 178 | 142 |
| V3 | 140 | 5 | 50 | 35.7 | 62 | 20 | 25.29 | 22.96 | 185 | 189 |
| B1 | 140 | 5 | 75 | 53.6 | 62 | 20 | 27.54 | 26.04 | 238 | 218 |
| B2 | 140 | 5 | 75 | 53.6 | 62 | 20 | 27.74 | 26.19 | 240 | 220 |
| B3 | 140 | 5 | 75 | 53.6 | 45 | 37 | 28.31 | 28.41 | 249 | 211 |
| B4 | 125 | 5 | 70 | 56 | 62 | 20 | 27.06 | 26.95 | 220 | 201 |
| B5 | 140 | 5 | 75 | 53.6 | 62 | 20 | 27.51 | 26.11 | 237 | 219 |

From Table 9, it is possible to gather the distinctly improved tear strength, measured in each case in accordance with ASTM 1970 and in accordance with GB/T 529-2008, of the inventive multilayer films B1 to B5 compared with the tear strength of the comparative films, the tear strength achieved according to the invention being improved by at least 10% compared with the tear strength of the comparative multilayer films.

In the case of identical total thickness of the multilayer films, it is advantageous when the thickness of the multi-ply layer (b) is at least 40% of the total thickness of the multilayer film (cf. Example B4 vs. Example V1; and also Examples B1-B3 and B5 vs. Examples V2 and V3).

In the case of identical multi-ply layer (b), it is additionally advantageous when, in the outer layer (a) or (c), the proportion of polypropylene homopolymer does not differ so much from the proportion of polypropylene copolymer (cf. Example B3 vs. Example B2).

What is claimed is:

1. A multilayer film comprising:
   (a) one layer (a) based on
      at least one propylene copolymer in an amount of at least 15% by weight,
      at least one propylene homopolymer in an amount of at least 40% by weight, and
      optionally up to 30% by weight of additives, based in each case on the total weight of the layer (a), the components always adding up to 100% by weight,
   (b) one multi-ply, inner layer (b) based on at least one homo- and/or copolyamide having isophoronediamine units as a polyamide component,
   (c) one layer (c) based on
      at least one propylene copolymer in an amount of at least 15% by weight,
      at least one propylene homopolymer in an amount of at least 40% by weight, and
      optionally up to 30% by weight of additives, based in each case on the total weight of the layer (c), the components always adding up to 100% by weight, and
   (d) one adhesion-promoter layer (d) arranged between the layer (a) and the layer (b), based on at least one modified thermoplastic olefin homo- or copolymer,
   (e) one adhesion-promoter layer (e) arranged between the layer (b) and the layer (c), based on at least one modified thermoplastic olefin homo- or copolymer, the thickness of the multi-ply layer (b) being at least 40% of the total thickness of the multilayer film.

2. The multilayer film of claim 1, wherein the thickness of the multi-ply layer (b) is at least 45% of the total thickness of the multilayer film.

3. The multilayer film of claim 1, wherein the layer (b) is at least three ply.

4. The multilayer film as claimed in claim 1, wherein all plies of the layer (b) are based on at least one homo- and/or copolyamide having isophoronediamine units as a polyamide component.

5. The multilayer film of claim 1, wherein the plies of the layer (b) each have, independently of one another, a thickness within the range of 2 μm to 30 μm.

6. The multilayer film of claim 3, wherein at least two plies of the multi-ply layer (b) have a different composition.

7. The multilayer film of claim 6, wherein the multi-ply layer (b) includes two outer plies and one or more plies arranged between the two outer plies;
   wherein the two outer plies of the multi-ply layer (b) differ in composition from the plies of the multi-ply layer (b) that are arranged between said two outer plies.

8. The multilayer film of claim 7, wherein the plies of the multi-ply layer (b) that are arranged between said two outer plies have the same composition.

9. The multilayer film of claim 3, wherein each of the plies of the multi-ply layer (b) comprises, as a polyamide component, at least one homo- and/or copolyamide having isophoronediamine units.

10. The multilayer film of claim 1, wherein the proportion of isophoronediamine units in the copolyamide is at least 1% by weight, based in each case on the total weight of the copolyamide.

11. The multilayer film of claim 1, wherein the isophoronediamine unit-comprising polyamide component of the multi-ply layer (b) has aliphatic or aromatic dicarboxylic acid units, and the copolyamide has ε-caprolactam units copolymerized with isophoronediamine units.

12. The multilayer film of claim 1, wherein, for some of the plies of the multi-ply layer (b), the polyamide component having isophoronediamine units.

13. The multilayer film of claim 7, characterized in that the two outer plies of the multi-ply layer (b) are based on a mixture of PA-6 and a copolyamide having isophoronediamine units, aromatic dicarboxylic acid units and copolymerized ε-caprolactam units.

14. The multilayer film of claim 1, wherein the multi-ply layer (b) has a layer thickness of at least 25 μm.

15. The multilayer film of claim 1, wherein the layer (a) and the layer (c) each contain, independently of one another, at least one propylene copolymer in an amount of up to 40% by weight, based in each case on the total weight of the layer (a) or the layer (c).

16. The multilayer film of claim 1, wherein the multi-ply layer (b) serves as a barrier layer.

17. The multilayer film of claim 1, wherein it is arranged symmetrically in relation to the central, multi-ply layer (b) and wherein the layer (a) and the layer (c) are each a surface layer.

18. The multilayer film of claim 1, wherein the multilayer film includes at least one adhesion-capable layer of adhesive (f) and/or at least one layer (h) based on a sealing composition.

19. An adhesive tape comprising a multilayer film of claim 1.

20. A waterproof sheeting material, preferably a bitumen-based waterproof sheeting material, against water and/or weathering effects, comprising a multilayer film of claim 1, optionally wherein the waterproof sheeting material is a protective covering for roof, as external cladding, as protective covering for buildings or parts thereof or as pipe cladding.

* * * * *

UNITED STATES PATENT AND TRADEMARK OFFICE
CERTIFICATE OF CORRECTION

Page 1 of 1

PATENT NO. : 11,731,404 B2
APPLICATION NO. : 16/647888
DATED : August 22, 2023
INVENTOR(S) : Michael Schuhmann et al.

It is certified that error appears in the above-identified patent and that said Letters Patent is hereby corrected as shown below:

In the Claims

Column 16, Line 27, Claim 12, after "having isophoronediamine units" insert --is mixed with at least one further polyamide component without isophoronediamine units.--

Signed and Sealed this
Fifth Day of March, 2024

Katherine Kelly Vidal
*Director of the United States Patent and Trademark Office*